US009014918B2

(12) United States Patent
Hagen et al.

(10) Patent No.: US 9,014,918 B2
(45) Date of Patent: Apr. 21, 2015

(54) HEALTH MONITORING SYSTEMS AND TECHNIQUES FOR VEHICLE SYSTEMS

(71) Applicants: Eric L. Hagen, Trafalgar, IN (US); Richard S. Fox, Columbus, IN (US); Nkemjika Ibekwe, Columbus, IN (US); Malcolm L. Smith, Indianapolis, IN (US)

(72) Inventors: Eric L. Hagen, Trafalgar, IN (US); Richard S. Fox, Columbus, IN (US); Nkemjika Ibekwe, Columbus, IN (US); Malcolm L. Smith, Indianapolis, IN (US)

(73) Assignee: Cummins Inc., Columbus, IN (US)

( * ) Notice: Subject to any disclaimer, the term of this patent is extended or adjusted under 35 U.S.C. 154(b) by 45 days.

(21) Appl. No.: 13/650,440

(22) Filed: Oct. 12, 2012

(65) Prior Publication Data

US 2014/0107885 A1 Apr. 17, 2014

(51) Int. Cl.

*A01B 69/00* (2006.01)
*B62D 6/00* (2006.01)

(Continued)

(52) U.S. Cl.

CPC ................ *G07C 5/008* (2013.01); *G07C 5/006* (2013.01)

(58) Field of Classification Search

CPC ........ G07C 5/008; G07C 5/006; G07C 5/085; G06Q 10/06; G06Q 10/025

USPC ............ 701/29.4, 33.8, 34.3, 117, 36, 39, 44, 701/45, 46, 47, 48, 49, 70, 75, 77, 79, 81, 701/83, 84, 85, 86, 90, 92, 91, 93, 97, 98, 701/99, 100, 101, 102, 103, 104, 105, 106, 701/107, 108, 109, 110, 111, 112, 114, 115, 701/116, 123, 29.1, 29.2, 29.3, 29.5, 29.6, 701/29.7, 29.8, 29.9, 30.1, 30.2, 30.3, 30.4, 701/30.5, 30.6, 30.7, 30.8, 30.9, 31.1, 31.2, 701/31.3, 31.4, 31.5, 31.6, 31.7, 31.8, 31.9, 701/32.1, 32.3, 32.4, 32.5, 32.6, 32.7, 32.8, 701/32.9, 33.1, 33.2, 33.3, 33.4, 33.5, 33.6, 701/33.7, 33.9, 34.1, 34.2, 34.4; 73/35.04, 73/35.06, 35.09, 35.12, 35.13, 45.1, 45.2, 73/45.8

See application file for complete search history.

(56) References Cited

U.S. PATENT DOCUMENTS 3,393,557 A 7/1968 Brown
3,783,681 A 1/1974 Hirt et al.

(Continued)

FOREIGN PATENT DOCUMENTS

EP 1 297 313 B1 9/2009
WO WO 02/095191 A2 11/2002

OTHER PUBLICATIONS

US/International Searching Authority, International Search Report and Written Opinion, PCT Application No. PCT/US2013/064004, dated Nov. 5, 2013, 14 pgs.

*Primary Examiner* — John Q Nguyen
*Assistant Examiner* — James E Stroud
(74) *Attorney, Agent, or Firm* — Krieg DeVault LLP

(57) ABSTRACT

Systems and methods for monitoring health of one or more subsystems of a vehicle system are disclosed. At least one sensor can be operatively coupled to a vehicle subsystem having an operational signature and a control system is coupled to the at least one sensor. Using information provided by the at least one sensor, the control system is structured to generate a reference signature of the subsystem during a learning phase and an operational signature of the subsystem subsequent to the learning phase. Systems and methods for identifying the particular subsystem exhibiting degraded performance are also disclosed.

12 Claims, 4 Drawing Sheets

(51) Int. Cl.

| | |
|---|---|
| ***B62D 11/00*** | (2006.01) |
| ***B62D 12/00*** | (2006.01) |
| ***B63G 8/20*** | (2006.01) |
| ***B63H 25/04*** | (2006.01) |
| ***G05D 1/00*** | (2006.01) |
| ***G06F 7/00*** | (2006.01) |
| ***G06F 17/00*** | (2006.01) |
| ***G06F 19/00*** | (2011.01) |
| ***G07C 5/00*** | (2006.01) |

(56) References Cited

U.S. PATENT DOCUMENTS

| | | | | |
|---|---|---|---|---|
| 4,197,767 | A | 4/1980 | Leung | |
| 4,309,900 | A | 1/1982 | Kreft et al. | |
| 4,590,804 | A | 5/1986 | Brull | |
| 4,977,395 | A | 12/1990 | Bozeman, Jr. | |
| 5,034,894 | A * | 7/1991 | Abe | 701/99 |
| 5,074,144 | A * | 12/1991 | Krofchalk et al. | 73/114.37 |
| 5,309,149 | A | 5/1994 | Bozeman, Jr. | |
| 5,381,692 | A | 1/1995 | Winslow et al. | |
| 5,402,521 | A | 3/1995 | Niida et al. | |
| 5,428,547 | A | 6/1995 | Ikeda | |
| 5,508,926 | A * | 4/1996 | Wade | 701/29.4 |
| 5,774,376 | A | 6/1998 | Manning | |
| 6,260,004 | B1 | 7/2001 | Hays et al. | |
| 6,370,957 | B1 | 4/2002 | Filippenko et al. | |
| 6,575,022 | B1 | 6/2003 | Schneider et al. | |
| 6,687,654 | B2 | 2/2004 | Smith, Jr. et al. | |
| 6,701,232 | B2 * | 3/2004 | Yamaki | 701/33.8 |
| 6,763,312 | B1 | 7/2004 | Judd | |
| 6,813,581 | B1 | 11/2004 | Snyder | |
| 6,871,160 | B2 | 3/2005 | Jaw | |
| 6,889,553 | B2 | 5/2005 | Robinson et al. | |
| 6,907,384 | B2 | 6/2005 | Adachi et al. | |
| 6,928,370 | B2 | 8/2005 | Anuzis et al. | |
| 6,972,668 | B2 * | 12/2005 | Schauble | 340/438 |
| 7,006,953 | B2 | 2/2006 | Takemura et al. | |
| 7,027,909 | B2 | 4/2006 | deBotton et al. | |
| 7,040,295 | B2 | 5/2006 | Karem | |
| 7,072,761 | B2 | 7/2006 | Hawkins et al. | |
| 7,073,485 | B2 | 7/2006 | Truscott et al. | |
| 7,103,507 | B2 | 9/2006 | Gorinevsky et al. | |
| 7,142,131 | B2 | 11/2006 | Sikora | |
| 7,147,366 | B2 * | 12/2006 | Melby et al. | 374/1 |
| 7,191,073 | B2 | 3/2007 | Astley et al. | |
| 7,222,002 | B2 | 5/2007 | Maine | |
| 7,222,027 | B2 | 5/2007 | Gorinevsky et al. | |
| 7,343,265 | B2 | 3/2008 | Andarawis et al. | |
| 7,366,627 | B2 | 4/2008 | Gordon et al. | |
| 7,379,845 | B2 | 5/2008 | Gorinevsky et al. | |
| 7,395,188 | B1 | 7/2008 | Goebel et al. | |
| 7,403,850 | B1 | 7/2008 | Boutin et al. | |
| 7,413,919 | B2 | 8/2008 | Qing et al. | |
| 7,444,231 | B2 | 10/2008 | Ancimer et al. | |
| 7,457,785 | B1 | 11/2008 | Greitzer et al. | |
| 7,458,266 | B2 | 12/2008 | Beard et al. | |
| 7,518,530 | B2 * | 4/2009 | Ohno et al. | 340/902 |
| 7,536,276 | B2 | 5/2009 | Pearson | |
| 7,571,057 | B2 | 8/2009 | D'Amato et al. | |
| 7,676,522 | B2 | 3/2010 | Klein et al. | |
| 7,676,523 | B2 | 3/2010 | Klein et al. | |
| 7,715,961 | B1 * | 5/2010 | Kargupta | 701/29.3 |
| 7,912,601 | B2 * | 3/2011 | Raichle et al. | 701/29.3 |
| 8,019,501 | B2 * | 9/2011 | Breed | 701/31.9 |
| 2002/0007237 | A1 | 1/2002 | Phung et al. | |
| 2002/0120386 | A1 * | 8/2002 | Shi et al. | 701/114 |
| 2002/0133273 | A1 * | 9/2002 | Lowrey et al. | 701/29 |
| 2005/0091004 | A1 | 4/2005 | Parlos et al. | |
| 2007/0260374 | A1 | 11/2007 | Morrison et al. | |
| 2008/0042615 | A1 * | 2/2008 | Serrels et al. | 320/101 |
| 2008/0148827 | A1 * | 6/2008 | Keski-Hynnila et al. | 73/114.31 |
| 2008/0157959 | A1 * | 7/2008 | Kuris et al. | 340/539.22 |
| 2008/0228338 | A1 * | 9/2008 | Howard et al. | 701/29 |
| 2008/0306648 | A1 * | 12/2008 | Takahashi | 701/29 |
| 2008/0312783 | A1 * | 12/2008 | Mansouri et al. | 701/29 |
| 2009/0120175 | A1 * | 5/2009 | Assaf et al. | 73/114.12 |
| 2009/0216399 | A1 * | 8/2009 | Ishikawa | 701/33 |
| 2009/0276112 | A1 * | 11/2009 | Mack | 701/29 |
| 2010/0174444 | A1 * | 7/2010 | Hansson et al. | 701/33 |
| 2010/0228429 | A1 * | 9/2010 | Lowrey et al. | 701/33 |
| 2010/0241339 | A1 * | 9/2010 | Proietty et al. | 701/109 |
| 2011/0046842 | A1 * | 2/2011 | Smith | 701/33 |
| 2011/0153145 | A1 * | 6/2011 | Kettenacker | 701/29 |
| 2011/0153146 | A1 * | 6/2011 | Wikner | 701/29 |
| 2011/0202225 | A1 * | 8/2011 | Willis et al. | 701/29 |
| 2011/0202228 | A1 * | 8/2011 | Brusarosco et al. | 701/29 |
| 2011/0224850 | A1 * | 9/2011 | Carroll | 701/19 |
| 2012/0022762 | A1 | 1/2012 | Rosero | |
| 2012/0035802 | A1 * | 2/2012 | Suzuki et al. | 701/29.1 |

* cited by examiner

HEALTH MONITORING SYSTEMS AND TECHNIQUES FOR VEHICLE SYSTEMS

FIELD OF THE INVENTION

The present invention is generally related to health monitoring systems and techniques for subsystems of a vehicle system, and more particularly, but not exclusively to, the monitoring of performance of one or more the subsystems and detection and identification of performance degradation associated with the same before registration of a fault code or failure of the subsystem.

BACKGROUND

Early detection of performance degradation of subsystems of a vehicle system may provide for more efficient operation, control, and repair of such subsystems. Early intervention can avoid high cost system and subsystem level failures and repairs, and may even prevent catastrophic failures.

Vehicle operators may identify performance or economy issues associated with the vehicle system, such as low power or poor performance, but such issues may not be of a nature that results in failure or the setting of a trouble/fault code in a diagnostic system of the vehicle. While performance issues may be able to be identified through testing and inspection of the various systems, these approaches often involve significant loss of service time and/or increased labor costs, and in some cases may result in misidentification or the inability to identify the subsystems or component causing the performance issues.

Engine and vehicle subsystems may include diagnostic monitors that trigger a fault/trouble code when performance has severely degrades. However, not all service events generate fault/trouble codes, and it is not practical for service technicians to be able to determine normal operational characteristics from existing diagnostic monitors for every type of subsystem and application. Furthermore, without a trouble/fault code, technicians may lack sufficient information to know which subsystems to investigate. Thus, there remains a need for further contributions in this area of technology.

SUMMARY

One embodiment of the present application includes a unique technique to monitor health of at least one subsystem associated with a powertrain and/or vehicle system. Another embodiment of the present application is a system health monitor that indicates deviations of at least powertrain/vehicle subsystem from a learned reference signature of the subsystem. Other embodiments include unique methods, systems, devices, and apparatus involving system health monitoring and diagnosis for one or more subsystems of a powertrain/vehicle subsystem. Still other embodiments include unique methods, systems, devices, and apparatus for detecting the presence of performance degradation of one or more subsystems; differentiating an operational signature of a subsystem from a reference operational signature of a subsystem; and recording the operational signature and the reference signature for subsequent comparison and diagnosis of a subsystem repair. Still other embodiments include unique methods, systems, devices, and apparatus having a learning capability, artificial intelligence, or the like, for increasing the accuracy and reducing the time associated with diagnosis of powertrain and/or vehicle performance issues. Further embodiments, forms, objects, aspects, features, benefits, and advantages of the present application shall become apparent from the figures and description provided herewith.

DETAILED DESCRIPTION OF REPRESENTATIVE EMBODIMENTS

Figure 1:
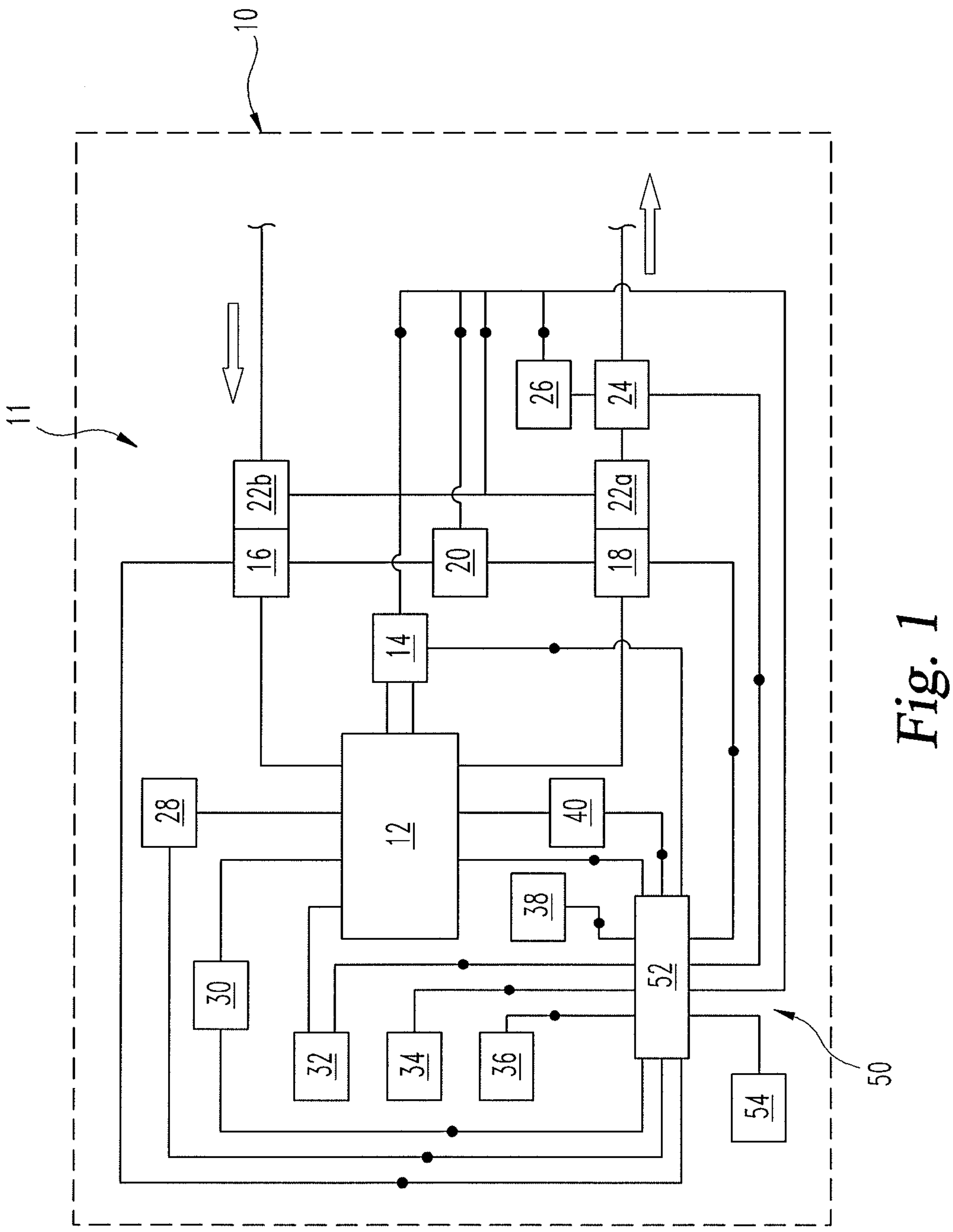
FIG. 1 is a schematic view of a vehicle system with a powertrain and a control system for monitoring various subsystems.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 is a schematic view of a vehicle system 10 and a powertrain 11 incorporated within vehicle system 10. The vehicle system 10 and/or powertrain 11 include one or more subsystems and at least one control system 50 that operate vehicle system 10. The control system 50 is operable to receive one or signals indicative of an operational signature of one or more of the subsystems, which subsystems may include all or a portion of powertrain 11. Examples of subsystems are discussed further below. Generally, the subsystems include any one or more subsystems having a measurable threshold operational characteristic that are disposed in a cooperative arrangement to operate powertrain 11 and/or vehicle system 10, to be operable by powertrain 11 and/or vehicle system 10, to support the operation of powertrain 11 and/or vehicle system 10 for use in a desired application, or to perform or support the performance of a function or task associated with the desired application for powertrain 11 and/or vehicle system 10. The control system 50 is structured to control operation of powertrain 11 and/or vehicle system 10 and/or one or more of the subsystems by controlling an operation of the powertrain 11, vehicle system 10, and/or one or more of the subsystems, and to receive signals indicative of the operational characteristics of the powertrain 11, vehicle system 10, and/or one or more subsystems. Generally, the control system 50 includes one or more sensors, an Engine Control Module (ECM), or the like or a combination thereof, to monitor and control an operation of one or more of the powertrain 11 and/or vehicle system 10.

In the illustrated embodiment, the powertrain 11 includes an engine 12 structured to generate power for vehicle system 10. As exemplarily illustrated, the engine 12 may be provided as an internal combustion engine (e.g., a diesel internal combustion engine). It will nevertheless be appreciated that the engine could be provided as any type of internal combustion engine (e.g., a diesel internal combustion engine, a gasoline internal combustion engine, any type of a gas internal combustion engine (e.g., CNG, LNG, LPG, etc.), an ethanol internal combustion engine, or the like or a combination thereof), a hybrid fuel/electric engine, an external combustion engine, an electric motor, a Stirling engine, a turbine engine, a reaction engine, or the like or a combination thereof. Alternatively or additionally, other components and/or subsystems of powertrain 11 may, for example, include one or more of a transmission, a motor, a motor-generator, a compressor, a pump, a water pump, a fuel pump, an oil pump, or the like or a combination thereof.

Vehicle system 10 and powertrain 11 may include various other subsystems shown schematically in FIG. 1. An engine output subsystem 14 includes any component or combination of components connected to an output shaft of engine 12. Engine output subsystem 14 may include any one or more and/or combination of a flywheel, damper, motor, motor-generator, drive shaft, transmission, clutch, gearbox, differential, for example. Engine 12 is also connected to an intake subsystem 16 to receive a fresh air flow and to an exhaust subsystem 18 to receive exhaust gases produced by engine 12. An EGR subsystem 20 connects intake subsystem 16 and exhaust subsystem 18 to provide a recirculation of exhaust gas. A turbocharger subsystem 22 includes a turbine 22*a* in exhaust subsystem 18 that is connected to a compressor 22*b* in intake subsystem 16. An aftertreatment subsystem 24 is connected to exhaust subsystem 18 to treat emissions from engine 12. In some embodiments, dosing subsystem 26 is connected to aftertreatment subsystem 24 to provide reductant to facilitate operation of components in aftertreatment subsystem 24.

Vehicle system 10 further includes various subsystems in addition to intake subsystem 16 that provide inputs to powertrain 11. For example, a fuel injection subsystem 28 can provide fuel to engine 12. A coolant subsystem 30 can provide a cooling fluid and/or air flow to maintain engine 12 at acceptable operating temperatures. A lubrication subsystem 32 provides oil or other fluid or fluids for lubrication of engine 12

Vehicle system 10 also includes various subsystems that operate in conjunction with or as a complement or supplement to engine 12. These include, for example, a power generation subsystem 34, an energy storage subsystem 36, an air subsystem 38, and an accessory drive subsystem 40. It will also be appreciated that a subsystem may also include one or more constituent portions or components of any of the above-mentioned subsystems, including powertrain 11. In any event, it is contemplated that the subsystems include at least one measurable operational value that has a threshold above or below which indicates performance degradation. Examples of operational values include flow rates, temperatures, vibration, speeds, torques, pressures, electric charge, voltage, and current associated with one or more of the subsystems.

Vehicle system 10 also includes a control system 50 that is operably connected to powertrain 11 and each of the subsystems 14, 16, 18, 20, 22, 24, 26, 28, 30, 32, 34, 36, 38 and 40. Control system 50 includes at least one controller, such as a vehicle control module, an engine control module, or other control device, hereinafter referred to generally as a diagnostic monitor 52, with a programmable processor that allows the controller to operate to receive signals corresponding to at least one operational value from each the subsystems that provide an operational signature of the subsystem. Control system 50 further includes a system health monitor 54, either as a stand-alone controller or incorporated in whole or in part with the diagnostic monitor 52, to process outputs from the diagnostic monitor 52 and, during a learning phase, define and record a reference signature for one or more of the operational values of one or more of the subsystems discussed above. The system health monitor 54 is further structured to, subsequent to the learning phase, record an actual operational signature of one or more of the subsystems discussed above. System health monitor 54 is operable via programming or instructions encoded thereon to provide monitoring and diagnostic capabilities of the health of one or more of the subsystems in accordance with the procedure set forth in the flow diagram of FIG. 5.

The system health monitor 54 and/or diagnostic monitor 52 can include a processor structured to execute operating logic defining various control, determining, comparing, storing and/or adjusting functions. This operating logic may be in the form of dedicated hardware, such as a hardwired state machine, programming instructions, and/or a different form as would occur to those skilled in the art. The processor may be provided as a single component or a collection of operatively coupled components; and may be comprised of digital circuitry, analog circuitry, or a hybrid combination of both of these types. When of a multi-component form, the processor may have one or more components remotely located relative to the others. The processor can include multiple processing units arranged to operate independently, in a pipeline processing arrangement, in a parallel processing arrangement, and/or such different arrangement as would occur to those skilled in the art. In one embodiment, the processor is a programmable microprocessing device of a solid-state, integrated circuit type that includes one or more processing units and memory. The processor can include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, and/or different circuitry or functional components as would occur to those skilled in the art to perform the desired control, management, and/or regulation functions. The memory devices can be comprised of one or more components and can be of any volatile or nonvolatile type, including the solid state variety, the optical media variety, the magnetic variety, any combination of these, or such different arrangement as would occur to those skilled in the art. In one form, the processor includes a computer network interface to facilitate communications using the Controller Area Network (CAN) standard among various subsystems of vehicle system 10.

Figure 2:
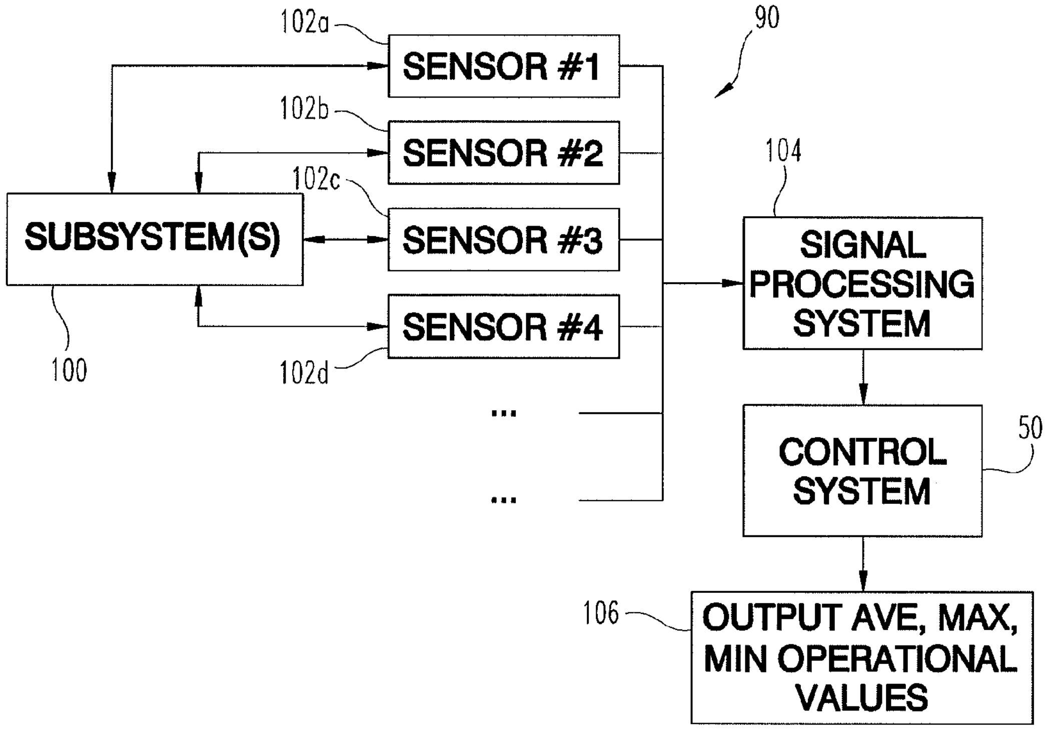
FIG. 2 is a schematic view of a subsystem monitoring and diagnostic system according to one embodiment.

Referring to FIG. 2, a health monitoring system 90 comprising a portion of vehicle system 10 includes control system 50 coupled to sensors associated with various ones of the subsystems and to an output. In one embodiment, the health monitoring system 90 includes diagnostic monitor 52 and system health monitor 54 of control system 50 that are structured to learn, monitor and record operational values of powertrain 11 and/or one or more of the subsystems 14, 16, 18, 20, 22, 24, 26, 28, 30, 32, 34, 36, 38 and 40, collectively and generically referred to as subsystem(s) 100. As used herein, an "operational value" of the subsystem 100 may include, for example, a temperature or pressure of a component; a temperature of a fluid (e.g., intake air, water, oil, exhaust gas, etc.); a pressure of a fluid; a flow rate of a fluid; a position of a component; a constituency of a fluid; a state of charge or power output of a component; a vibration, displacement, vibration frequency, or velocity of a component of the subsystem; and the like or a combination thereof. One specific example of an operational value which can be learned, monitored and recorded is a flow rate of exhaust gas in EGR subsystem 20. Another specific example of an operational value that can be learned, monitored and recorded is a temperature of exhaust subsystem 18 or coolant subsystem 30.

As exemplarily illustrated, the health monitoring system 90 includes a first sensor 102*a*, a second sensor 102*b*, a third sensor 102*c*, a fourth sensor 102*d*, and a number of additional sensors, which may be generically referred to as "sensors 102." Each of the one or more sensors 102 are associated with respective a corresponding one of the subsystems 100. The health monitoring system 90 further includes a signal processing system 104 having an input coupled to the output of each sensor 102. Control system 50 includes an input coupled to an output of the signal processing system 104 and an output 106 that displays or otherwise provides access to recordings of the average, minimum and maximum operational values of the respective subsystems over time. Output 106 can include a memory in which the operational values are stored, and can further include a device that facilitates review and analysis of the operational values (e.g., a monitor, printer, computer, processor, or the like). The sensors 102, the signal processing system 104, the control system 50 and the subsystems 100 can be communicatively coupled to each other via wired or wireless connections.

The sensors 102 are operatively coupled to the subsystems 100 and are structured to provide an indication of one or more operational values of the subsystems 100 (e.g., during operation of the powertrain 11 and/or vehicle system 10) and generate sensor signals indicative of these operational values. In one embodiment, one or more of the sensors 102 include a sensing element structured to measure an operational value of the subsystem 100. Examples of a sensing element that can be included within the sensor 102 include a flow meter, temperature sensor, pressure sensor, position sensor, counter, current meter, state of charge indicator, volt meter, accelerometer, a strain gauge, and the like. The sensor 102 can include a single sensing element to measure one or more operational values of the subsystems 100, or multiple sensing elements (e.g., as a delta sensor) to measure one or more operational values of the subsystems 100.

In one embodiment, the first sensor 102*a* may be structured to measure oil temperature and/or oil pressure within the internal combustion engine 12, the second sensor 102*b* may be structured to measure EGR flow in EGR subsystem 20, the third sensor 102*c* may be structured to measure exhaust gas temperature from the internal combustion engine 12 in exhaust subsystem 18, the fourth sensor 102*d* may be structured to measure intake air pressure of the internal combustion engine 12 in intake system 16. Other embodiments contemplate other specific arrangements for sensors and subsystems in addition to or in place of those specifically identified above.

Although the embodiment illustrated in FIG. 2 depicts all sensors 102 within the health monitoring system 90 as being coupled to the same signal processing system 104, it will be appreciated that multiple signal processing systems 104 can be provided, and that some or each of the sensors 102 can be coupled to a unique signal processing system 104. It will also be appreciated that the health monitoring system 90 may include any number of sensors, and may even include one sensor. It will also be appreciated that the health monitoring system 90 may include any type of sensor.

Figure 3:
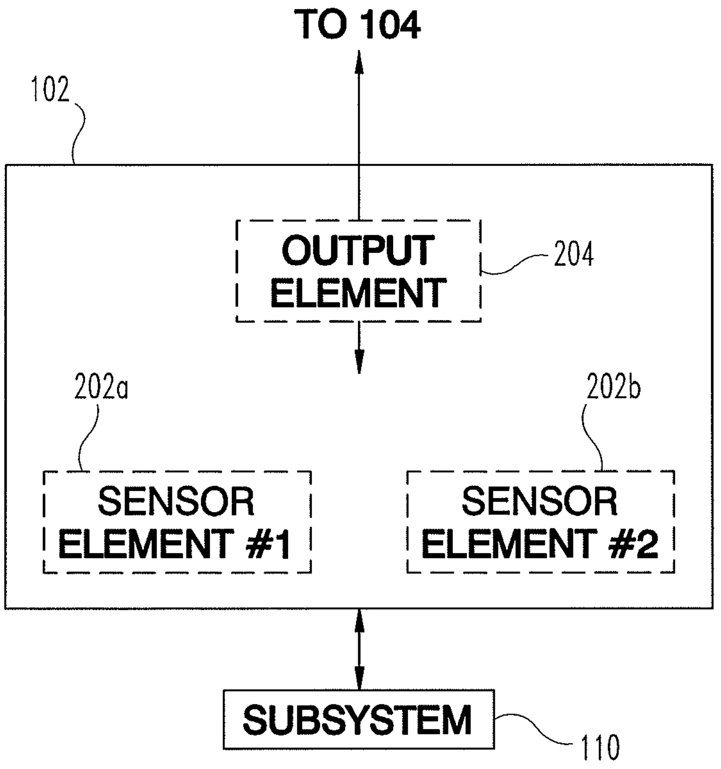
FIG. 3 is a schematic view of a sensor shown in FIG. 2, according to one embodiment.

Referring to FIG. 3, one embodiment of the sensor 102 shown in FIG. 2 includes a first sensor element 202*a*, a second sensor element 202*b* and an output element 204. The first sensor element 202*a* and the second sensor element 202*b* are spaced apart from each other by any desired distance so as to be operatively coupled to different portions of the same subsystem 100 or component thereof. Each of the first sensor element 202*a* and the second sensor element 202*b* generate signals corresponding to the operational value measured at their respective locations relative to the subsystem 100. The output element 204 receives the signals from the first sensor element 202*a* and the second sensor element 202*b*, performs an operation on the signals, and outputs the result of that operation as the aforementioned sensor signal of the sensor information. In one embodiment, the output element 204 performs a delta operation on the signals, and outputs the result of that operation (i.e., the difference between the signals) as the aforementioned sensor signal. Although FIG. 3 illustrates an embodiment in which the output element 204 is part of the sensor 102, the output element 204 may be partially or completely included within operating logic of the signal processing system 104, the control system 50, or an ECM or a combination thereof.

Referring back to FIG. 2, the signal processing system 104 is structured to receive and process the sensor signal generated by the sensors 102. In one embodiment, the signal processing system 104 can include an amplifier structured to amplify the sensor signal generated by the sensors 102. Exemplary amplifiers that may be used include an analog amplifier, a digital amplifier, or a combination thereof. In another embodiment, the signal processing system 104 can include a filter structured to eliminate or otherwise reduce a signal-to-noise ratio in the sensor signal. Exemplary filters that may be used include passive electronic filters, digital filters, mechanical filters, or the like or a combination thereof. In one embodiment, an input of the filter may be coupled to the output of the amplifier. Although FIG. 2 illustrates an embodiment in which the health monitoring system 90 includes the signal processing system 104, it will be appreciated that the signal processing system 104 may be omitted. Although FIG. 2 illustrates an embodiment in which the signal processing system 104 is separate from the sensors 102 and the control system 50, it will be appreciated that the signal processing system 104 may be completely or partially included within the sensors 102, within operating logic of the control system 50, or a combination thereof. In various embodiments, the signal processing system 104 may be completely or partially included in the operating logic (such as programming instructions) of an Engine Control Module (ECM), or separate therefrom.

The control system 50 is structured to generate a reference signature and an operational signature of subsystems 100 based on the average, maximum and minimum operational values provided from the sensor information. During a learning phase, as discussed further below, control system 50 learns the reference signature of one or more of the subsystems 100 and stores the operational values recorded during the learning phase in memory as a reference signature. Subsequent to the learning phase, control system 50 records a filtered running average of the operational values and maximum and minimum operational values of the one or more subsystems 100 and stores the operational values in memory as an operational signature. In one embodiment, the operational values of the operational signature are recent operational values. As used herein, recent operational values includes all operational values generated since completion of the learning phase; all operational values generated since a service event; all operational values generated since input of a reset flag; and/or all operational values generated during a predetermined number of most recent iterations of operation of the subsystem. During a service event, a technician can access the stored operational signature compare the operational signature to the learned reference signature to assess the health of the one or more subsystems 100.

In some embodiments, output device 106 can be an ECM, a database, a datalink of an on-board diagnostic system, a dashboard that is local to or remote from the vehicle system 10, or the like or a combination thereof. By recording and outputting operational and reference signatures for subsystems 100, one or more of the aforementioned subsystems 100 can be diagnosed for potential failure or performance issues before the performance degrades to failure or the setting of a trouble/fault code in the vehicle diagnostic system. Accordingly, servicing of vehicle system 10 can be accomplished more quickly and effectively since the particular subsystem or subsystems having an operational signature that deviates from the reference signature can be readily identified, allowing early intervention to address performance and/or economy issues.

Figure 4:
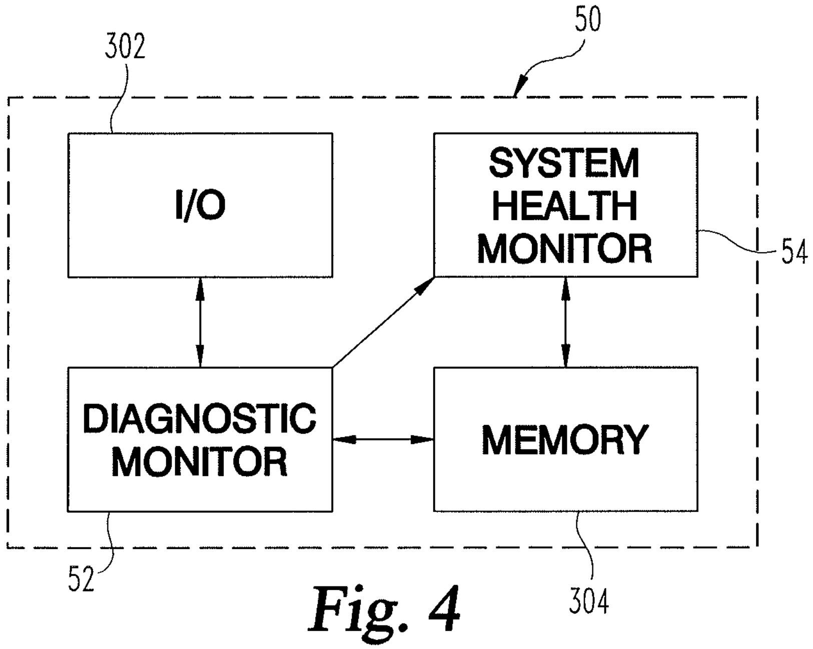
FIG. 4 is a schematic view of the control system shown in FIGS. 1 and 2, according to one embodiment.

Referring to FIG. 4, one embodiment of the control system 50 shown in FIG. 2 can include an input/output or I/O interface 302 (also referred to herein as an "interface module"), a memory 304, the diagnostic monitor 52 coupled to the I/O interface 302 and memory 304, and the system health monitor 54 coupled to the diagnostic monitor 54 and memory 304. The I/O interface 302, the memory 304, the diagnostic monitor 52 and the system health monitor 54 can be communicatively coupled to each other via wired or wireless connections.

The I/O interface 302 may be provided as any device suitable for receiving sensor signals from the signal processing system 104 and transmitting control signals to output 106. In one embodiment, the I/O interface 302 may further be structured to transmit and receive information to and from other devices such as diagnostic computers, and the like.

Generally, the memory 304 is structured to store the learned reference signatures associated with subsystems 100 and the subsequent operational signatures subsystems 100. The memory 304 can be provided as one or more components and can be of any volatile or nonvolatile type, including the solid state variety, the optical media variety, the magnetic variety, any combination of these, or such different arrangement as would occur to those skilled in the art.

The diagnostic monitor 52 receives outputs from the sensors the various subsystems 100 and records the same in memory 304. Diagnostic monitor 52 further provides the outputs from the various sensors to system health monitor 54 which receives the outputs as operational values. During the learning phase, the system health monitor 54 develops a reference signature for each of the subsystems 100 that includes an average operational value, a maximum operational value, and a minimum operational value, and stores the references signatures in memory 304. When the learning phase is complete, system health monitor 304 receives the sensor outputs from subsystems 100 and identifies a running average of recent operational values, maximum operational value, and a minimum operational value and stores the same as an operational signature in memory 304.

In one embodiment, the system health monitor 54 can be structured to provide a side-by-side comparison or overlay of the operational signature and the reference signature to facilitate the determination of a performance degradation. The comparison can indicate deviations of the operational value running average of the operational signature from the average operational value of the reference signature, even when the operational values do not exceed the maximum operational value and are less than the minimum operational value of the reference signature. Significant periods of deviation of the running average from the average of the reference signature can indicate performance degradation of the subsystem even if the maximum and minimum operational values are not exceeded. The comparison can also indicate instances when the minimum and/or maximum operational values of the operational signature are less than or exceed the minimum and/or maximum operational values of the reference signature. Such a comparison can indicate subsystem performance degradation even if the running average of the operational signature does not deviate substantially from the average operational value of the reference signature.

In one embodiment, the system health monitor 54 may be structured to adjust or update any reference signature stored in memory 304 based on a standard calibration (e.g., as implemented with a service tool for loading programs into the control system 50), through a standard adaptive learning routine (such as those including an initial learning trial) or other artificial intelligence routine, or the like or a combination thereof. In one embodiment, the system health monitor 54 may update an initially-stored reference signature based upon, for example, an application for which the vehicle system 10 and/or powertrain 11 is being used. The reference signature can be periodically corrected or updated by the system health monitor 54, either automatically to adjust for varying applications of the vehicle system 10 and/or in response to a reset flag or input to system health monitor 54 and/or control system 50.

Figure 5:
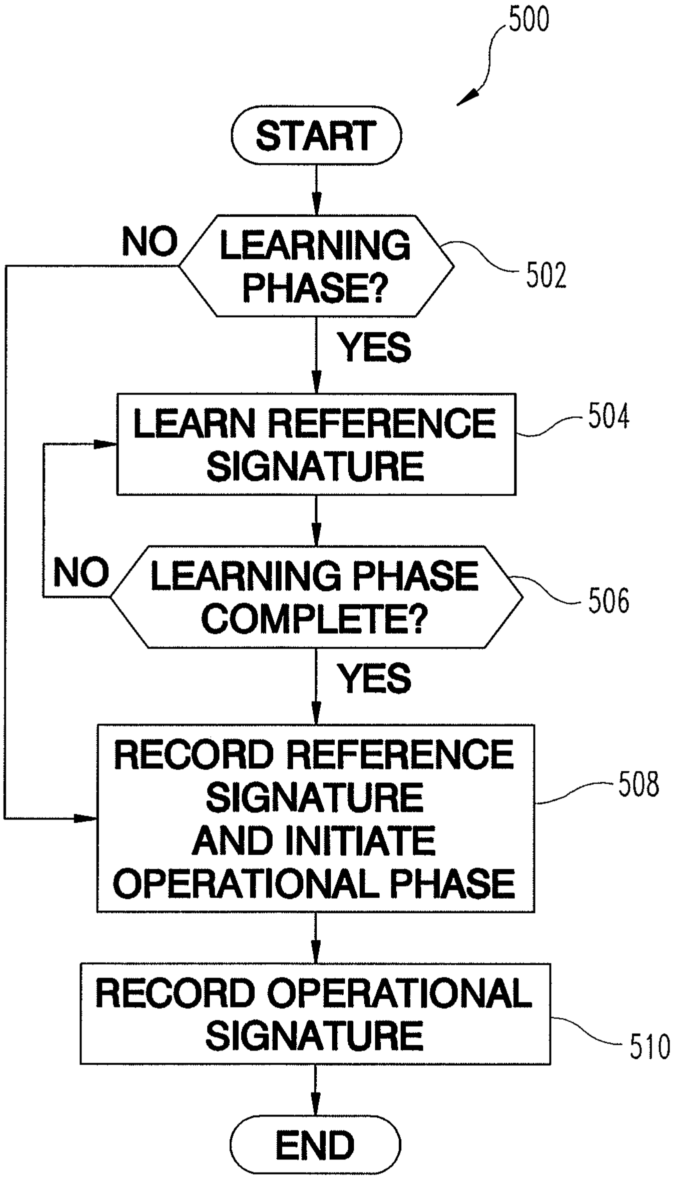
FIG. 5 is a flow diagram of a process for monitoring and diagnosing one or more of the subsystems of the vehicle system of FIG. 1.

Referring to FIG. 5, a flow diagram for a subsystem health monitoring and diagnostic procedure 500 is shown that is executable by control system 50 with system health monitor 54. The procedure starts at conditional 502 in which it is determined whether procedure 500 is in a learning phase. During the learning phase, a reference signature of one or more of the subsystems is learned to determine normal average, minimum and maximum operational values for each of the subsystems. The learning phase can be initiated automatically upon the initial start-up of vehicle system 10 or upon start-up of the subsystem 100 in which learning is to be initiated. A learning phase can also be initiated by a re-set flag or re-learn command that is received from an input to control system 50. A re-set flag can be established if, for example, vehicle system 10 is employed in a new application, an incorrect operational signature was previously learned, if a service event has occurred, or the sensors or other diagnostics associated with the subsystem are to be recalibrated.

If conditional 502 is negative, procedure 500 continues at operation 508, discussed further below. Conditional 502 is negative in the event the learning phase is complete. If conditional 502 is affirmative, then procedure 500 continues at operation 504 in which a reference signature for at least one of the subsystems 100 of the vehicle system 10 is learned to establish a baseline of normal operational values. In one embodiment, operation 504 includes reading existing or already employed outputs relating to the subsystem 100 from diagnostic monitor 52 to learn the normal operational values for the subsystem. The learning phase continues for a calibrated number of diagnostic iterations or for a predetermined period of time in which the associated subsystem 100 is operated. During the learning phase, the system health monitor 54 records in a memory thereof a reference signature that includes the minimum, maximum and average operational values for each of the subsystems 100 being monitored. At the next start-up or operation of the subsystem, procedure 500 continues at conditional 506 in which it is determined whether the learning phase has been completed. If negative, procedure 500 returns to operation 504 to continue the learning phase of the reference signature. It should be understood that the learning phase for various ones of the subsystems need not be complete simultaneously, although such an arrangement is not precluded.

Conditional 506 is affirmative once the number of iterations has been reached or the predetermined operational time period has elapsed. When the learning phase is complete, procedure 500 continues at operation 508 where the reference signature is recorded or stored in, for example, non-volatile memory of control system 50 and the operational phase is initiated. In one embodiment, the reference signature includes an average value, a minimum value, and a maximum value for the monitored operational value(s) for each of the subsystems. In the operational phase, control system 50 with health monitor 54 operates to record the actual operational values of the monitored parameter(s) of each of the subsystems 100 in non-volatile memory to provide an operational signature for the subsystem(s). In one embodiment, the operational signature includes a filtered running average of the operational value of the monitored parameter along with maximum and minimum operational values of the monitored parameter. At operation 510, the operational signature is recorded in memory for subsequent access and comparison to the reference signature so that a performance degradation of the affected subsystem can be readily identified from the monitored subsystems.

When a performance or economy complaint from a driver or user of the vehicle system 10 is received, an initial investigation typically observes diagnostic monitor 52 and checks for any trouble/fault codes. Many conditions may result in which poor performance or economy does not trigger a trouble/fault code. In this case, the technician can access the operational signature and reference signature created by system health monitor 54 for each of the monitored subsystems 100 to more quickly locate the source of the performance degradation. The recorded operational signature of a properly functioning subsystem 100 stays within the minimum and maximum operational values learned by the reference signature. The recorded operational signature of a poorly performing subsystem will exhibit a running average operational value that deviates substantially from the learned average operational value. A poorly performing subsystem may, in addition or instead, include one or more maximum operational values that exceed the learned maximum operational value, and/or include one or more minimum operational values that are less than the learned minimum operational value. Accordingly, a poorly performing subsystem may be identified for a service event even if subsystem performance has not sufficiently deteriorated to a point that sets a fault/trouble code.

The health monitoring system 90 allows a service technician to examine the operational signature of a suspected subsystem and compare the same to the reference signature to determine a health condition for the subsystem. If deviations are identified, the service technician can further investigate the corresponding subsystem components for a potential subsystem service event. If no deviations are identified, the service technician can select another subsystem for investigation until the poorly performing subsystem(s) are identified.

Many different aspects and embodiments of the present application are envisioned. For example, in a first of such aspects, a system can include a powertrain including a plurality of associated subsystems. Each of the subsystems includes at least one sensor. The sensors are structured to generate operational values associated with the respective subsystem to which each sensor is coupled. The system also includes a control system coupled to each of the sensors. The control system is configured to generate a reference signature for each of the subsystems based on the operational values generated by the associated sensor during a learning phase of powertrain operation. Each of the reference signatures includes a learned normal average, a learned maximum, and a learned minimum of the operational values of the associated subsystem over the learning phase. The control system is also structured to record the reference signatures for each of the subsystems in a memory of the control system. The control system is further structured to generate an operational signature for each of the subsystems during operation of the powertrain subsequent to the learning phase. The operational signatures each include a running average, a maximum, and a minimum of the operational values of the subsystem generated by the at least one sensor since the learning phase. The control system is structured to record the operational signatures for each of the subsystems in the memory and output the operational signatures and the reference signatures.

In one embodiment of the system, at least one of the plurality of subsystems is an exhaust gas recirculation subsystem and the at least one sensor operatively coupled thereto is structured to monitor an exhaust gas recirculation flow during operation of the powertrain. In a refinement of this embodiment, the at least one sensor comprises a flow meter.

In another embodiment of the system, the control system includes a diagnostic monitor structured to receive inputs of the operational values of the subsystems from the sensors and a health monitoring system coupled to the diagnostic monitor. The health monitoring system is structured to receive the operational values of the subsystems from the diagnostic monitor, generate the reference signature and the operational signature for each of the subsystems, and output the reference signatures and the operational signatures to the memory.

In another embodiment, the control system is configured to generate a second reference signature for at least one of the plurality of subsystems during a second learning phase of powertrain operation. In one refinement of this embodiment, the second learning phase is initiated in response to a reset flag input to the control system. In another refinement of this embodiment, the reset flag corresponds to a recalibration of the at least one subsystem. In yet another refinement of this embodiment, the reset flag corresponds to a deployment of the system in a substantially different application. In another refinement of this embodiment, the reset flag corresponds to the reference signature being associated with an inadequate performance of the at least one subsystem during the learning phase.

In another embodiment of the system, the plurality of subsystems include at least two of an exhaust subsystem, an exhaust aftertreatment subsystem, an exhaust reductant dosing subsystem, an exhaust gas recirculation subsystem, a turbocharger subsystem, a fuel injection subsystem, a cooling subsystem, an accessory drive subsystem, a power generation subsystem, a power storage subsystem, a compressed air subsystem, and a lubrication subsystem. In another embodiment of the system, each of the operational signatures is based at least in part on a filtered recent performance of actual operational values generated by the sensor associated with the subsystem.

According to another aspect, a method includes receiving sensor information from at least one sensor operatively coupled to at least one subsystem of a vehicle system including a powertrain; generating a reference signature for the at least one subsystem based on the sensor information during a learning phase of operation of the powertrain of the vehicle system, wherein the reference signature includes a minimum operational value, a maximum operational value and an average operational value of the at least one subsystem during the learning phase of powertrain operation; and recording subsequent to the learning phase an operational signature of the at least one subsystem during powertrain operation of the vehicle system, wherein the operational signature includes a minimum operational value, maximum operational value, and a filtered running average of operational values of the at least one subsystem generated by the at least one sensor since the learning phase.

According to one embodiment, the method includes comparing the operational signature with the reference signature and determining whether the operational signature indicates a subsystem service event by a deviation of the operational signature from the reference signature. In one refinement of this embodiment, the deviation includes at least one of the maximum operational value and the minimum operational value of the operational signature being greater than or less than, respectively, the maximum operational value and the minimum operational value of the reference signature. In another refinement of this embodiment, the deviation includes the filtered running average of operational values of the operational signature deviating from the average operational value of the reference signature, and the maximum operational values of the operational signature being less than the maximum operational value of the reference signature and the minimum operational values of the operational signature being greater than the minimum operational value of the reference signature.

In another embodiment of the method, the reference signature is generated after a predetermined number of iterations of operation of the subsystem during the learning phase. In yet another embodiment, the method includes re-learning the reference signature in response to a reset flag. In one refinement of this embodiment, the reset flag includes at least one event selected from the group consisting of: a recalibration of the at least one subsystem; a service event of the at least one subsystem; a deployment of the vehicle system in a substantially different application; and the reference signature being improperly learned during the learning phase.

In another aspect, a method includes powering operation of a vehicle system with a powertrain and a plurality of subsystems associated with the powertrain; during a learning phase associated with the operation of the powertrain, learning a reference signature for each of the subsystems, wherein the reference signatures each include a minimum operational value, a maximum operational value, and an average operational value of the associated subsystem during the learning phase; recording the reference signature in a memory of a control system of the vehicle system; generating an operational signature for each of the subsystems during operation of the powertrain subsequent to the learning phase, wherein the operational signatures each include a minimum operational value, a maximum operational value, and a filtered running average of operational values of the associated subsystem; recording the operational signatures in the memory of the control system; and identifying at least one of the subsystems for service by comparing the operational signature with the reference signature of each of the subsystems.

In one embodiment, the method includes updating the reference signature of the identified subsystem after servicing the subsystem.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by any claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein are desired to be protected.

What is claimed is:

1. A system comprising:

a powertrain for a vehicle system including a plurality of associated subsystems;

each of the subsystems including at least one sensor, the sensors being structured to generate operational values associated with the respective subsystem to which each sensor is coupled;

a control system of the vehicle system coupled to each of the sensors, the control system including an engine control module including a signal processing system with an electronic filter, the control system configured to:

initiate a learning phase of powertrain and subsystem operation in response to one or more of a start-up of the vehicle system and a start-up of the respective subsystem;

generate a reference signature for each of the subsystems based on the operational values generated by the associated sensor during the learning phase, wherein each of the reference signatures includes a learned normal average, a learned maximum, and a learned minimum of the operational values of the associated subsystem over the learning phase;

update a learned reference signature for at least one of the subsystems in a second learning phase of subsystem operation initiated in response to a re-set flag input into the engine control module corresponding to a deployment of the powertrain in a different application;

record the reference signatures for each of the subsystems in a memory of the control system;

generate an operational signature for each of the subsystems during operation of the powertrain subsequent to the second learning phase, wherein the operational signatures each include a filtered running average of recent operational values, a maximum of the operational values, and a minimum of the operational values of the subsystem generated by the at least one sensor since the second learning phase;

record the operational signatures for each of the subsystems in the memory; and output the operational signatures and the reference signatures.

2. The system of claim 1, wherein at least one of the plurality of subsystems is an exhaust gas recirculation subsystem and the at least one sensor operatively coupled thereto is structured to monitor an exhaust gas recirculation flow during operation of the powertrain.

3. The system of claim 2, wherein the at least one sensor comprises a flow meter.

4. The system of claim 1, wherein the control system comprises:

a diagnostic monitor structured to receive inputs of the operational values of the subsystems from the sensors; and a health monitoring system coupled to the diagnostic monitor structured to receive the operational values of the subsystems from the diagnostic monitor, generate the reference signature and the operational signature for each of the subsystems, and output the reference signatures and the operational signatures to the memory.

5. The system of claim 1, wherein the plurality of subsystems include two or more subsystems selected from the group consisting of: an exhaust subsystem, an exhaust aftertreatment subsystem, an exhaust reductant dosing subsystem, an exhaust gas recirculation subsystem, a turbocharger subsystem, a fuel injection subsystem, a cooling subsystem, an accessory drive subsystem, a power generation subsystem, a power storage subsystem, a compressed air subsystem, and a lubrication subsystem.

6. A method, comprising:

receiving with an engine control module sensor information from at least one sensor operatively coupled to at least one subsystem of a vehicle system including a powertrain, the engine control module including a signal processing system with an electronic filter;

initiating a learning base of powertrain and subsystem operation with the engine control module in response to one or more of a start-up of the vehicle system and a start-up of the subsystem;

generating with the engine control module a reference signature for the at least one subsystem based on the sensor information output during the learning phase of operation, wherein the reference signature includes a minimum operational value, a maximum operational value and an average operational value of the at least one subsystem during the learning phase of powertrain operation;

updating with the engine control module at least one reference signature to replace a learned reference signature for the at least one subsystem in a second learning phase of subsystem operation, the second learning phase being initiated in response to a re-set flag input into the engine control module corresponding to deployment of the powertrain in a different application; and recording with the engine control module, subsequent to the second learning phase, an operational signature of the at least one subsystem during powertrain operation of the vehicle system, wherein the operational signature includes a minimum operational value, maximum operational value, and a filtered running average of operational values of the at least one subsystem generated by the at least one sensor since the second learning phase.

7. The method of claim 6, further comprising:

comparing the operational signature with the reference signature; and determining whether the operational signature indicates a subsystem service event by a deviation of the operational signature from the reference signature.

8. The method of claim 7, wherein the deviation includes at least one of the maximum operational values and the minimum operational values of the operational signature being greater than or less than, respectively, the maximum operational value and the minimum operational value of the reference signature.

9. The method of claim 7, wherein the deviation includes the filtered running average of operational values of the operational signature deviating from the average operational value of the reference signature, and the maximum operational values of the operational signature being less than the maximum operational value of the reference signature and the minimum operational values of the operational signature being greater than the minimum operational value of the reference signature.

10. The method of claim 6, wherein the reference signature is generated after a predetermined number of iterations of operation of the subsystem during the corresponding one of the learning phase and second learning phase.

11. A method, comprising:

powering operation of a vehicle system with a powertrain and a plurality of subsystems associated with the powertrain, the vehicle system including an engine control module that includes a signal processing system with an electronic filter, the signal processing system being operable to receive operational signals from the plurality of subsystems;

initiating a learn in phase of powertrain and subsystem operation with the engine control module in response to one or more of a start-up of the vehicle system and a start-up of the subsystem;

during the learning phase, learning a reference signature with the engine control module for each of the subsystems from the operational signals, wherein the reference signatures each include a minimum operational value, a maximum operational value, and an average operational value of the associated subsystem during the learning phase;

updating with the engine control module at least one reference signature to replace a learned reference signature for at least one of the plurality of subsystems in a second learning phase of subsystem operation, the second learning phase being initiated in response to a re-set flag input into the engine control module corresponding to deployment of the powertrain in a different application;

recording the reference signatures in a memory of the engine control module;

generating with the engine control module an operational signature for each of the subsystems during operation of the powertrain subsequent to the second learning phase, wherein the operational signatures each include a minimum operational value, a maximum operational value, and a filtered running average of operational values of the associated subsystem;

recording the operational signatures in the memory of the engine control module; and identifying at least one of the subsystems for service by comparing the operational signature with the reference signature of each of the subsystems.

12. The method of claim 11, which includes updating the reference signature of the identified subsystem after servicing the subsystem.

* * * * *